Nov. 20, 1928.
H. E. STONEBRAKER
METHOD AND APPARATUS FOR CUTTING GEARS
Filed April 25, 1927
1,692,520
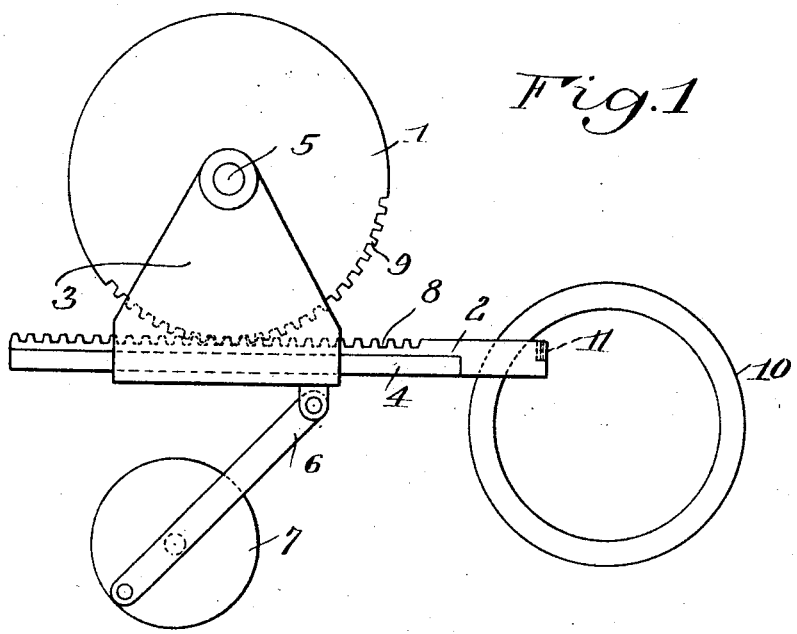
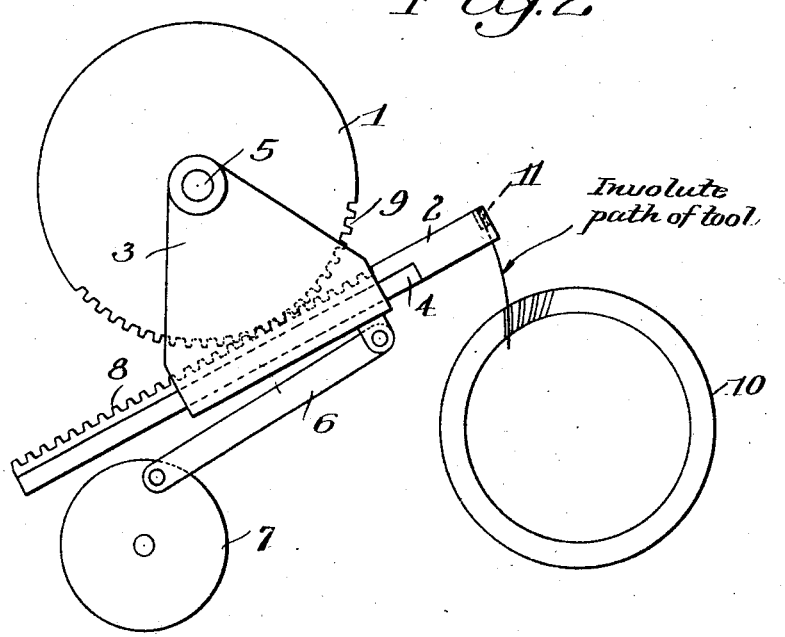
INVENTOR
Harold E. Stonebraker Patented Nov. 20, 1928.

1,692,520

UNITED STATES PATENT OFFICE.

HAROLD E. STONEBRAKER, OF ROCHESTER, NEW YORK.

METHOD AND APPARATUS FOR CUTTING GEARS.

Application filed April 25, 1927. Serial No. 186,435.

This invention relates to a method and apparatus for cutting curved tooth gears, and has for its object more particularly to afford practical and efficient cutter mechanism for producing curved gear teeth having involute curvature endwise.

A further object of the invention is to afford mechanism by which a curved gear tooth can have a generated involute endwise curvature and be produced with a tool having a back and forth movement, thus lending itself to use with two-tool gear cutting machines or other types of machines adapted for fast production.

Still another object of the invention is to afford a method and mechanism for generating an endwise involute curvature on gear teeth and thereby making it possible to produce curved bevel gears with teeth having involute endwise curves.

To these and other ends, the invention, in its fundamental aspect, comprises the principles and features that will appear from the following description when read in conjunction with the accompanying drawings, the novel features being pointed out in the claims following the specification.

In the drawings:

Figure 1 is a side elevation of a cutter mechanism illustrating the adaptation of the invention for cutting bevel gears and showing the parts when the tool is at one end of its cutting stroke, and Figure 2 is a similar view showing the parts when the tool has reached the opposite end of its cutting stroke.

The invention may be carried out in many different ways, being applicable to either one or two-tool gear cutting machines, also with either single-edged or doubled-edged tools, and to either generating or non-generating machines, by which is meant a generation of the profile of the gear tooth.

This invention has to do with generating the endwise curvature of a curved gear tooth, as distinguished from the profile or side of the tooth, and this is accomplished by controlling the path of a back and forth moving tool in such a way that it traces an involute path such as results from rolling a straight line bodily on a circular curve. It is believed to be new in the art of gear cutting to generate a curved tooth lengthwise according to an involute with a back and forth travelling tool, or to accomplish the stated purpose by rolling a tool support bodily on a circular or curved guide member.

A practical form of mechanism embodying the invention is herein illustrated and comprises a stationary guide member 1 which preferably has a circular periphery that controls the movement of the tool support. The tool support is designated at 2, being mounted in a carrier 3. The tool support may be gibbed to the carrier 3 as indicated at 4, or otherwise mounted on the carrier so as to have sliding movement within or relatively to the carrier, but to be fixed against any other movement with relation to the carrier. The carrier 3 is mounted to swing on a bearing 5 preferably arranged concentrically of the circular guide member 1, and the carrier 3 may be oscillated about the bearing 5 by any suitable operating mechanism, such for instance as a link 6 connected to a crank 7 that may be driven in any convenient way. The detail driving power or mechanism to the different units forms no part of the invention, as any conventional or known drive can be employed, and this invention has to do only with the control of the movement of the tool support, permitting the latter to be moved back and forth, preferably, although not necessarily, by an oscillating carrier and at the same time rolled bodily on a curved guide member to effect an involute path of travel for the tool.

The relative rolling motion between the tool support 2 and the guide member 1 may be effected by rack teeth 8 on the tool support meshing with a toothed portion 9 on the circular guide member. The engagement between the teeth 8 and 9 prevents any slip between the stationary guide member 1 and the tool support 2, and consequently as the latter is moved back and forth with the carrier 3, it rolls bodily around the curved guide member 1 and at the same time has a sliding relative movement in the carrier 3 to permit the roll on the curved guide member. The desired relative rolling movement between the curved guide member and the tool support, and the prevention of slip therebetween may be accomplished in other ways than by the meshing teeth 8 and 9, as for instance, by flexible straps, each wrapping partially around the curved guide member and having one end affixed thereto with its other end affixed to the tool support, as well known in gear cutting machines for generating profiles, and the particular mechanism for effecting this is not so important, so long as the structure is such as to permit the tool support to roll bodily without slip on a stationary curved guide member.

10 designates a bevel gear blank which may be suitably mounted and be operated upon by a tool 11 arranged on the tool support 2. It will be seen that as the crank 7 rotates, the carrier 3 swings back and forth from the position shown in Figure 1 to that shown in Figure 2, and vice versa, at the same time causing the tool support and tool to move between the two positions shown in these figures. During this operation, the tool and tool support partake of the swinging movement of the carrier 3, but at the same time having an endwise sliding motion relatively to said carrier due to the engagement between the teeth 8 on the tool support and the teeth 9 on the stationary guide member 1. Consequently, the tool will move in a cutting path defined by a true involute as indicated in Figure 2, and will cut teeth on the gear that will be curved endwise according to an involute.

A machine having this invention applied thereto may be provided with any suitable or conventional tool lifting mechanism for disengaging the tool from the gear blank during the return stroke, but inasmuch as such devices are known in the art, it is not considered necessary to illustrate any such mechanism in connection with the present invention.

While I have described the method and structure with reference to a certain embodiment, the invention is not confined to the particular structure or procedure herein disclosed, and this application is intended to cover any modifications or adaptations of the improvement coming within the principle outlined above and the scope of the following claims.

I claim:

1. The method of imparting endwise curvature to gear teeth, consisting in rolling a tool support bodily and without slippage on a curved guide member with which the tool support is in immediate contact, the latter being located with reference to the blank so that said rolling motion causes the tool to travel across the face of the blank in a curved non-circular cutting path.

2. The method of generating endwise involute curvature on gear teeth, consisting in rolling a tool support bodily and without slippage on a circular guide member which is so located with reference to the gear blank that said rolling motion causes the tool to travel across the face of the blank in an involute cutting path, the tool support being in immediate contact with the circular guide member during its rolling motion.

3. The method of imparting endwise curvature to gear teeth consisting in moving a tool support back and forth and simultaneously rolling the tool support bodily and without slippage on a curved guide member so located with reference to the gear blank that said rolling motion causes the tool to travel across the face of a blank in a curved cutting path, the tool support being in immediate contact with the curved guide member during its rolling motion.

4. A gear cutter mechanism comprising a tool support, a curved guide member with which the tool support is in immediate contact and on which the tool support has a bodily rolling movement without slippage, the guide member being so located with reference to a gear blank that said rolling movement causes the tool support to travel across the face of the blank in a curved cutting path, and means for imparting back and forth movement to the tool support.

5. A gear cutter mechanism comprising a tool support, and a curved guide member with which the tool support is in immediate contact and on which the tool support has bodily rolling movement without slippage, said guide member being so located that said rolling movement causes the tool to travel across the face of the blank in a curved cutting path, the tool support and guide member having interengaging teeth, and an oscillatory carrier in which the tool support is slidably mounted.

6. A gear cutter mechanism comprising a tool support and a circular guide member on which the tool support has bodily rolling movement, the guide member being so located with reference to the gear blank that said rolling movement causes the tool to travel across the face of a blank in a curved cutting path, rack teeth on the tool support engaging teeth on the guide member, and a carrier mounted concentrically of the guide member and slidably holding the tool support, the latter being arranged between the circular guide member and the bottom surface of the carrier.

In witness whereof, I have hereunto signed my name.

HAROLD E. STONEBRAKER.